United States Patent
Ka et al.

(10) Patent No.: US 11,049,242 B2
(45) Date of Patent: Jun. 29, 2021

(54) PORTABLE AND RAPID SCREENING IN VITRO DETECTION SYSTEM

(71) Applicant: POCT BIOTECHNOLOGY CO., LTD., Taipei (TW)

(72) Inventors: Chun Ka, Taipei (TW); Yu-Seng Tien, Taipei (TW); Kai-Hsiung Chang, Taipei (TW)

(73) Assignee: POCT BIOTECHNOLOGY CO., LTD., Taipei (TW)

( * ) Notice: Subject to any disclaimer, the term of this patent is extended or adjusted under 35 U.S.C. 154(b) by 178 days.

(21) Appl. No.: 16/473,609

(22) PCT Filed: Dec. 30, 2016

(86) PCT No.: PCT/CN2016/113618
§ 371 (c)(1),
(2) Date: Jun. 25, 2019

(87) PCT Pub. No.: WO2018/120068
PCT Pub. Date: Jul. 5, 2018

(65) Prior Publication Data
US 2019/0347794 A1   Nov. 14, 2019

(51) Int. Cl.
*G06T 7/00* (2017.01)
*B01L 3/00* (2006.01)

(52) U.S. Cl.
CPC .............. *G06T 7/0012* (2013.01); *B01L 3/50* (2013.01); *G06T 2207/30024* (2013.01)

(58) Field of Classification Search
CPC ......... G06T 7/0012; G06T 2207/30024; G06T 7/0014; B01L 3/50; G01N 21/01

USPC ......................................................... 382/128
See application file for complete search history.

(56) References Cited

U.S. PATENT DOCUMENTS

| | | | |
|---|---|---|---|
| 2006/0129327 A1* | 6/2006 | Kim | B82Y 5/00 702/19 |
| 2012/0183442 A1* | 7/2012 | Kloepfer | G01N 21/8483 422/82.05 |
| 2016/0131592 A1* | 5/2016 | Cooper | G01N 21/8483 356/402 |

(Continued)

FOREIGN PATENT DOCUMENTS

| CN | 101598599 A | * | 12/2009 |
|---|---|---|---|
| CN | 202794038 U | * | 3/2013 |
| CN | 105784697 A | * | 7/2016 |

*Primary Examiner* — Juan A Torres
(74) *Attorney, Agent, or Firm* — Chun-Ming Shih; HDLS IPR Services

(57) ABSTRACT

A portable and rapid screening detection in vitro detection system includes: an in vitro detector, a detection box, a photograph image processor, a transmission interface control processor, a power unit, and an electronic device. The in vitro detector is in a closed environment, and a detection box is disposed in the in vitro detector, and the detection box having a sample insertion opening for inserting in the rapid screening paper after detection. The photograph image processor is disposed on one side of the detection box for capturing the display image of the rapid screening paper after detection. The transmission interface control processor is disposed in the in vitro detector, for transmitting the display image temporarily stored in the camera module. The power unit is disposed in the in vitro detector, for providing the power required by the in vitro detector.

4 Claims, 8 Drawing Sheets

(56) References Cited

U.S. PATENT DOCUMENTS

2016/0327489 A1* 11/2016 Chou ................. G01N 21/8483

* cited by examiner

PORTABLE AND RAPID SCREENING IN VITRO DETECTION SYSTEM

BACKGROUND OF THE INVENTION

Field of the Invention

The present invention relates to a rapid screening detection device, and in particular to a portable and rapid screening in vitro detection system that is capable of detecting and obtaining real-time the physiological reactions and the extent of physiological reaction of a person under detection.

The Prior Arts

With the improvement of the detection technology, there exist in the market many rapid screening detection devices or a rapid screening paper 40 that can be used to obtain the results real-time. For example, pregnancy detection rod or rapid flu screening paper, etc. Refer to FIG. 1, the rapid screening paper 40 makes use of the antibody/antigen-specific immune response to show the results through colors. The rapid screening paper 40 includes a sample region 41, an observation region 42, and an identification marker 43. the sample region 41 is for placement of sample to be detected. Wherein the sample may be any liquid such as saliva, urine or blood, and the observation region 42 includes at least a test group 421 and a control group 422 for displaying the results of the reaction. The control group 422 enables a user to make positive or negative comparison with the results in the test group 421 whether this detection process is normal. The identification marker 43 is used to provide the basic information of the rapid screening paper 40.

The rapid screening paper 40 is only able to inform the person under detection the result of detection is negative or positive. However, it is not able to provide more information other than this. Therefore, the detection results not being able to be graded may cause great pains to the bodies and minds of the person-under-detection and his family, thus resulting in unnecessary medical waste.

If the concentration of the antigen/antibody detected for the person under detection is low, such that the detection results can not be identified easily by the naked eyes, thus leading to incorrect judgments and diagnoses. The existing technology of solving the problem utilizes the extra and unfixed way to capture the image of the rapid screening paper 40 after detection to further be analyzed through a specific equipment to further generate a result. As a result, the detected image is captured through the extra and unfixed way, which causes the captured image unstable to further provide the error information for the in vitro detection system, causing unnecessary panic.

However, the above technical means utilizing a photo tool may be a specific means, such as an image equipment set in the hospital, but, the specific means is not easily bought or obtained by an ordinary person and the person to be detected needs a lot of time for waiting when detecting; besides the above-mentioned specific means, the image of the rapid screening paper 40 after detection is captured through the use of another portable electronic device such as smart phone or computer, etc. and the display image is transmitted to a computer server or a mutual equipment to really obtain a detection result; during the portable electronic device for taking a picture, because of taking a picture at the outer space, there exists a difference of the captured images dependent on different environments, which causes the errors in the interpretation. The existing holder that may go with and stable the portable electronic device helps to photograph the display images, as a result, although it avoids the portable electronic device shaking to effect the photographed results, however, the operation steps are too complicated to cause the user's inconvenience; moreover, the pixels, the focal distance and the brightness of the different portable electronic devices are different so that there exist some differences in the photographed images to cause the errors in the interpretation, causing a lot of inconveniences.

Further, since a screening device that combines with an image analysis is huge and too expensive, which is unaffordable to an ordinary person. The screening device needs a corresponding system and a software to cooperate with each other. Therefore, it takes more time to transmit and analyze the display images, lacking the real-time function.

Due to the rapid development of the transportation, people may travel around the world frequently, and when they enter/exit the Customs, the screening device is also configured in the exit/entry administration. As a first prevention to avoid the epidemi, the present way of determination makes use of an infrared body temperature detection device for detecting whether people have a fever, if they further are screened, some suspicious persons will be isolated by the exit/entry administration so that the detected results are transmitted to an administration unit having the complete detection devices for analysis. Since it takes more waiting time to detect reactions and interpret results, as a result, the suspicious isolated persons will be isolated for several hours, causing them lots of inconveniences.

To solve the above-mentioned problem, the present invention provides a portable in vitro detection system that is capable of detecting and obtaining reaction results and reaction extents real-time.

SUMMARY OF THE INVENTION

In view of the problems and drawbacks of the prior art, the present invention provides a portable and rapid screening in vitro detection system, including an in vitro detector that allows the users to carry around with them, and the in vitro detector has a closed environment for photographing the display image of a rapid screening paper after detection and the display image is transmitted to an electronic device. Through an analysis software that is set in the electronic device, which compare with other parameters for analysis, the detected results are generated.

To achieve the above purpose, the present invention provides a portable and rapid screening detection in vitro detection system, comprising: an in vitro detector having a closed environment; a detection box, disposed in the in vitro detector, and the detection box having a sample insertion opening for inserting in the rapid screening paper after detection; a photograph image processor, disposed on one side of the detection box for capturing the display image of the-rapid screening paper after detection, and the photograph image processor has a lens, a plurality of LED light sources, and a camera module, wherein the lens captures the results of the rapid screening paper after detection in the detection box through using an image capture button; the LED light sources are electronically connected to the lens for temporarily storing a display image photographed by the lens; a transmission interface control processor, disposed in the in vitro detector, for transmitting the display image temporarily stored in the camera module; a power unit, disposed in the in vitro detector, for providing the power required by the in vitro detector; and an electronic device, which has an analysis software for receiving the display image of the rapid screening paper after detection transmitted by the transmission interface control processor to generate respectively a parameter packet and a determination data, while receiving the newest data parameter from a cloud, and the data parameter is compared with the determination data for analysis, to finally generate a detection report having physiological response and extent of physiological response for a person under detection.

The physiological response and physiological response extent of a person under detection is generated through the electronic device having the analysis software comparing with a data parameter generated by the cloud of the present invention.

Another objective of the present invention is to provide a portable and rapid screening in vitro detection system; apart from analyzing physiological response of a person under detection, it analyzes the physiological response extent of the person under detection to arrive at diagnosis and treatment in the early stage and planned effects.

To achieve the above objective, the technical means of the present invention is that a sample database that corresponds to the analysis software, which is set in the cloud. The sample database has display images of the physiological response detections with various extents and those detected image results are calculated by the cloud to generate the data parameters. When the user starts the analysis software in the electronic device, the analysis software automatically downloads the data parameter that is then stored in the analysis software. When the detection is finished, the electronic device automatically receives the display images transmitted from the in vitro detection system, a parameter having a physiological response, a display image packet, and a determination data of a current detected result are respectively generated by the analysis software, and the analysis software further transmits the parameter packet to the cloud for storing and collecting the data, while the determination data and the data parameters compare with the response extent according to the classification of the detection to further generate the detection report having the physiological response extent.

Wherein the rapid screening paper after detection has a sample region, an observation region, and an identification marker respectively, and the observation region includes at least a control group and a test group for displaying the detection results.

Wherein the cloud receives the physiological response having the detected results and images of the test group in the parameter packet for storing and collecting the data.

Wherein the electronic device is one of a smart phone, a tablet computer, a desktop computer, and a laptop computer.

Wherein, the transmission interface control processor is used to perform wired transmissions through a USB connection slot, and is used to perform wireless transmissions through Bluetooth or WiFi.

Wherein, one side of the in vitro detector is disposed on a display panel having a power display light, a wireless connection indicator light, a sample display light, and a transmission display light.

The present invention has the advantage of the technical effects in that the present invention is able to analyze and to compare the display image in the case of the wired or the wireless. Besides, the physiological response and physiological response extent is known as negative/positive, and it is possible for analyzing the physiological response extent to give the person under detection suggestions to arrive at diagnosis and treatment in the early stage and planned effects.

BRIEF DESCRIPTION OF THE DRAWINGS

The related drawings in connection with the detailed descriptions of the present invention to be made later are described briefly as follows, in which.

DETAILED DESCRIPTION OF THE PREFERRED EMBODIMENT

The purpose, construction, features, functions and advantages of the present invention can be appreciated and understood more thoroughly through the following detailed descriptions with reference to the attached drawings.

In the following, an embodiment is used to describe the various details of the present invention. However, it does not mean that this embodiment represents all the embodiments of the present invention. Other embodiments can be envisaged by people familiar with this field, and thus they all fall into the scope of the present invention.

Figure 2:
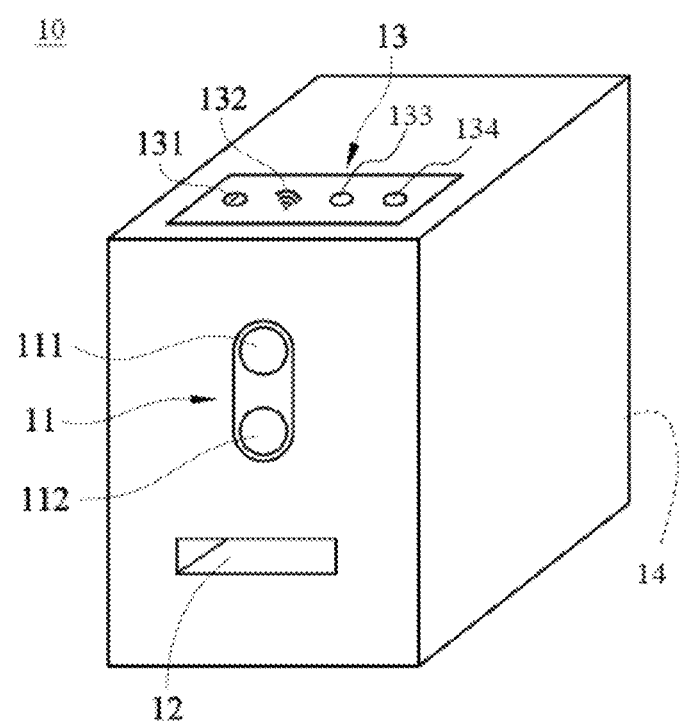
FIG. 2 is a schematic diagram of the present invention.
Figure 3:
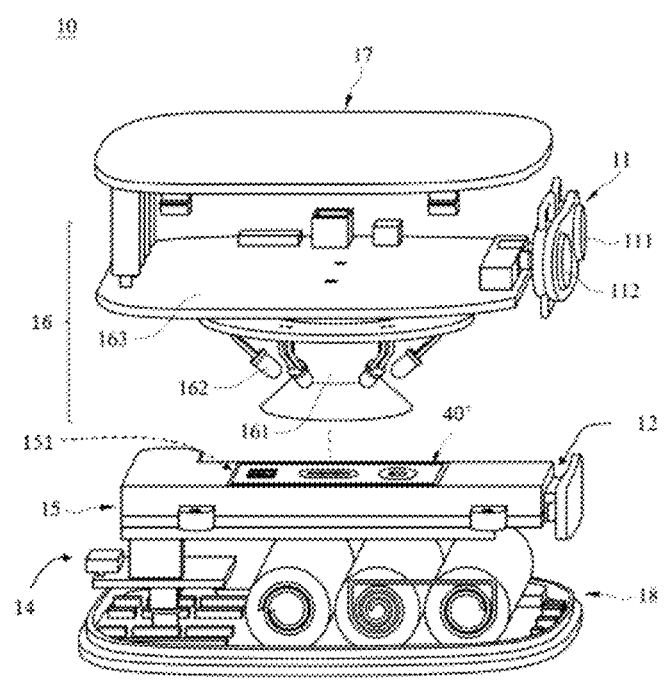
FIG. 3 is a schematic diagram of an inner structure of the present invention.

Refer to FIGS. 2 and 3, which show a portable and rapid screening in vitro detection system according to the present invention that includes an in vitro detector 10 and an electronic device 30 (refer to FIG. 7), and the in vitro detector 10 is electronically connected to the electronic device 30 through a wired or wireless way, in which one side of the in vitro detector 10 has a control panel 11 that has a power button 111 and an image capture button 112. The in vitro detector 10 has a sample insertion opening 12 and an USB connection slot 14 that are respectively disposed on different sides. A top side of the in vitro detector 10 has a detection panel 13 that has a power display light 131, a wireless connection indicator light 132, a sample display light 133 and a transmission display light 134 and so on, for warning the user whether the in vitro detector 10 is started and operated or not. The electronic device 30 can be a smart phone, a tablet computer, a desktop computer, and laptop computer etc.

Figure 1:
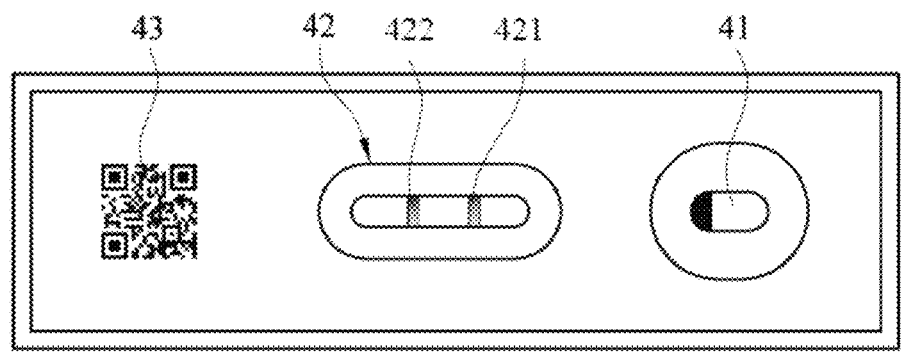
FIG. 1 is a schematic diagram of a rapid screening paper after detection according to the existing technology.

Refer to FIGS. 2 and 3, the inner side of the in vitro detector 10, which is a closed environment, has a detection box 15, a photograph image processor 16, a photograph image processor 16, a transmission interface control processor 17, and a power unit 18. In which, a rapid screening paper 40' after detection is inserted into the detection box 15 from the sample insertion opening 12, and the rapid screening paper 40' after detection has a sample region 41, an observation region 42, and an identification-marker 43 (as shown in FIG. 1); the implementation of the in vitro detector 10 is described as the same as the present technology as follows: when the rapid screening paper 40' after detection is in contact with the detection transmitter 151 that is set on one end of the detection box 15, the sample display light 133 of the detection panel 13 is started so that the user knows whether the rapid screening paper 40' after detection is correctly inserted into the into the detection box 15, starting to capture the images. The photograph image processor 16 is set on one side of the detection box 15, is electronically connected to the image capture button 112. The image capture button 112 controls the photograph image processor 16 to capture the result of the detection box 15 to generate a display image 1611 (shown in FIG. 5) and then the display image 1611 is transmitted to the transmission interface control processor 17. The transmission interface control processor 17 can be wireless Bluetooth transmission or WIFI transmission and is for a wired transmission through electronically connected to the USB connection slot 14. The above operation is that the power unit 18 provides the power required by those electronic devices, starting the power unit 18 by the power button 111. The power unit 18 may be rechargeable or disposable power supply, and the power unit 18 is connected to the outer power supply for charging through the USB connection slot 14.

Figure 4:
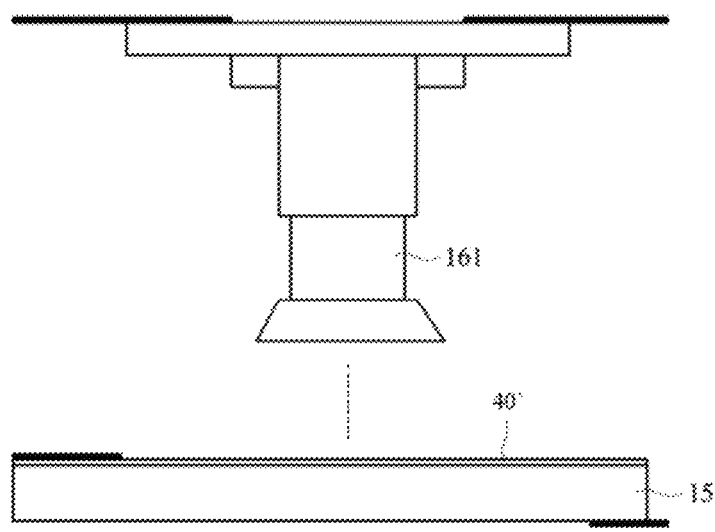
FIG. 4 is a schematic diagram of an image capture equipment according to the present invention.
Figure 5:
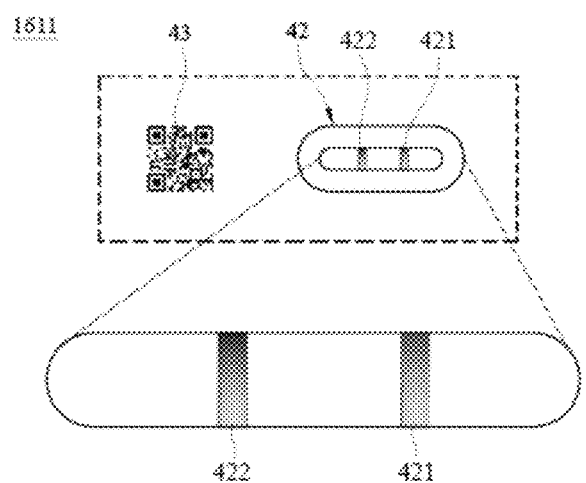
FIG. 5 is a schematic diagram of an image captured according to the present invention.

Refer to FIGS. 3 to 5, the photograph image processor 16 has a lens 161, a plurality of LED light sources 162, and a camera module 163, wherein the lens 161 faces the detection box 15 and the image capture button 112 controls the lens 161 for photographing, and a distance is about 8 mm between the lens 161 and the detection box 15. Those LED light sources 162 are electronically connected to two sides of the lens 161 for providing the light sources required by the lens 161—when taking a picture. The lens 161 is further electronically connected to the camera module 163 for temporarily storing the display image 1611 therein. The display image 1611 includes the observation region 42 and the identification marker 43.

Figure 7:
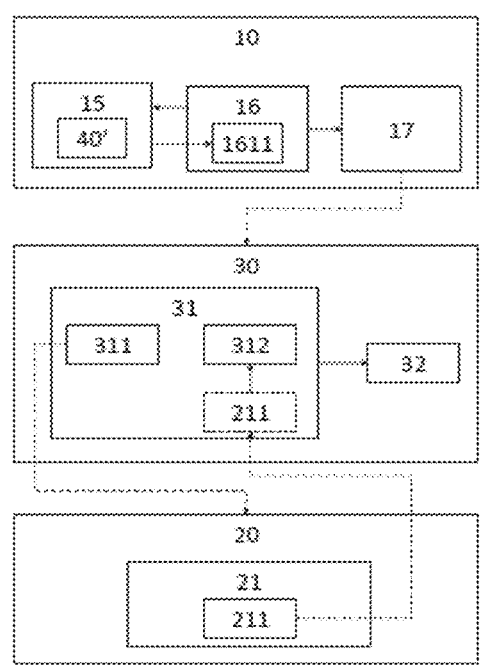
FIG. 7 is a system block diagram according to the present invention.

Refer to FIG. 7, the transmission interface control processor 17, electronically connected to the photograph image processor 16, receives the display image 1611 generated by the photograph image processor 16 to directly transmit the display image 1611 to the electronic device for analysis by the wireless or wired way, while the transmission display light 134 of the detection panel 13 is started (shown in FIG. 2).

Figure 8:
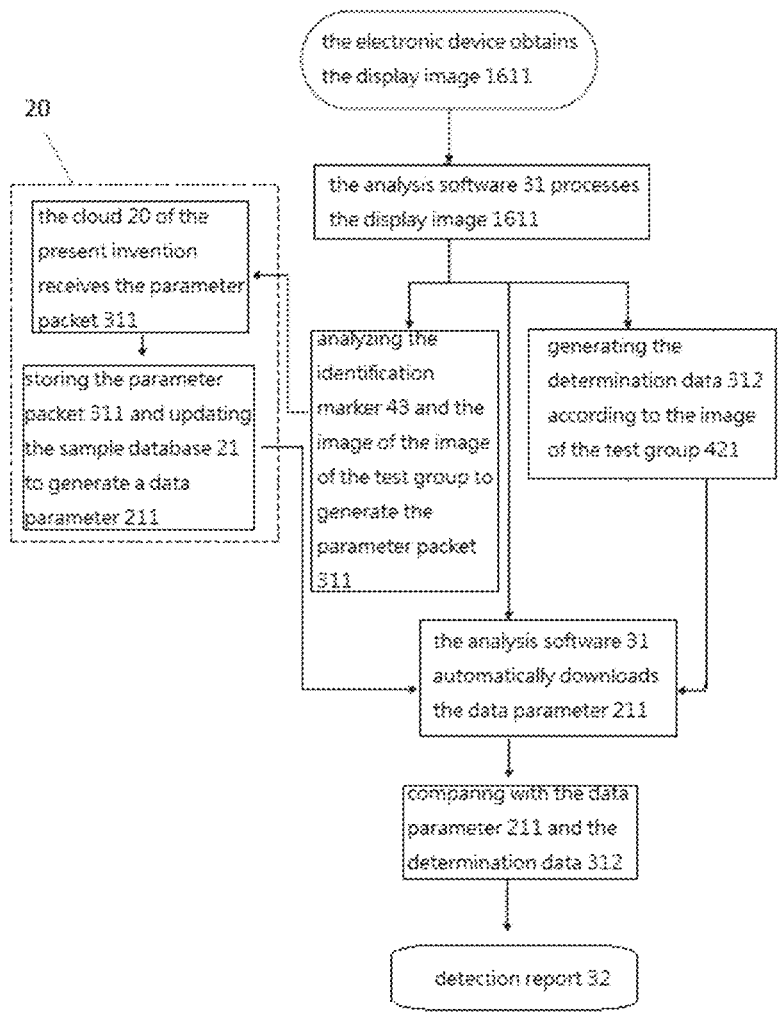
FIG. 8 is an analysis flow chart according to the present invention.

Refer to FIGS. 5, 7 and 8, the electronic device 30 has an analysis software 31, when the detection is finished, the electronic device 30 receives the display image 1611 transmitted by the in vitro detector 10. After the analysis software 31 performs the image removal, denoising, and sharpness processing for the display image 1611, it generates a parameter packet 311 and a determination data 312. The parameter packet 311 includes the signal of the identification marker 43 and the image of the detection 421 that are transmitted to a cloud of the present invention. The determination data 312 is generated by the test group 421.

Figure 6:
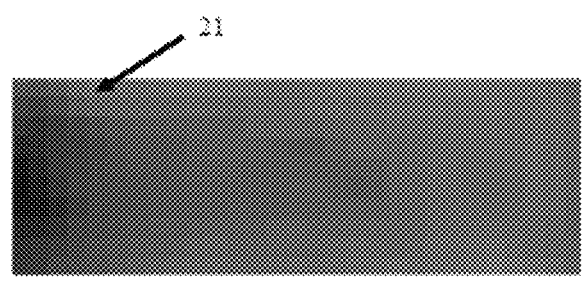
FIG. 6 is a schematic diagram of a sample database according to the present invention.

Refer to FIGS. 6 and 7, a sample database 21 that corresponds to the analysis software, which is set in the cloud 20. The display image 1611 of the physiological response detection has various kinds of extents in the sample database 21. Since the physiological response extent is different, the concentration of the component to be tested in the sample will also vary. Therefore, the results represented on the rapid screening paper 40' after detection are also different depths. Then, a data parameter 211 is generated by the cloud 20. When the user turns on the electronic device 30 under the wired environment, the analysis software 31 automatically downloads the newest data parameter 211 from the cloud 20 so that the electronic device 30 still perform the comparison of the detected results under the wireless environment.

Refer to FIGS. 7 and 8 again, after the cloud 20 receives the parameter packet 311 transmitted by the analysis software 31, the cloud 20 is for data classification and data filing, dependent on the parameter of the physiological response in the parameter packet and the image of the test group 421 (shown in FIG. 5). If the provided image is new, the sample data 21 will be updated to generate a new data parameter 211 that the analysis software 31 downloads while the determination data 312 and the data parameter 211 are for quantitative comparison analysis of the parameters according to the detection classification and extent to generate a detection report 32 having physiological response and physiological response extent of the person under detection.

The portable and rapid screening in vitro detection system of the present invention captures the display image 1611 of the rapid screening paper 40' after detection in a closed environment by the in vitro detector 10, without affecting the result of image capturing due to differences in environment or photographing equipment. Therefore, the user can carry the in vitro detector 10 and carry it out anytime and anywhere; and after the capture image processor 16 captures the display image 1611, the display image 1611 can be transmitted to the electronic device 30 through the transmission interface control processor 17 in real time for the analysis of the result, so that it saves the process for the user to upload the data by himself; and the in vitro detection system can periodically download the data parameter 211 from the cloud 20 through the analysis software 31 in the electronic device 30, so the analysis and comparison of the display image 1611 can be performed in the case of wired or wireless. In addition to knowing that the physiological response is negative/positive, the physiological response extent can also be analyzed and suggestions can be provided to achieve diagnosis and treatment in the early stage and planned effects.

The above detailed description of the preferred embodiment is intended to describe more clearly the characteristics and spirit of the present invention. However, the preferred embodiments disclosed above are not intended to be any restrictions to the scope of the present invention. Conversely, its purpose is to include the various changes and equivalent arrangements which are within the scope of the appended claims.

What is claimed is:

1. A portable and rapid screening detection in vitro detection system, comprising:
   an in vitro detector having a closed environment;
   a detection box, disposed in the in vitro detector, and the detection box having a sample insertion opening for inserting in a rapid screening paper after detection;
   a photograph image processor, disposed on one side of the detection box, and the photograph image processor has a lens, a plurality of LED light sources, and a camera module respectively, wherein the lens captures the results of the rapid screening paper after detection in the detection box through using an image capture button; the LED light sources are electronically connected to the lens for providing the light sources required by the lens during taking a picture, and the camera module is electronically connected to the lens for temporarily storing a display image photographed by the lens;

a transmission interface control processor, disposed in the in vitro detector, for transmitting the display image temporarily stored in the camera module;

a power unit, disposed in the in vitro detector, for providing the power required by the in vitro detector; and an electronic device, which has an analysis software for receiving the display image of the rapid screening paper after detection transmitted by the transmission interface control processor to generate respectively a parameter packet and a determination data, while receiving a newest data parameter from a cloud, and the newest data parameter and the determination data are for the quantitative comparison analysis of the parameter according to the classification and extents of the detection, to finally generate a detection report having a physiological response and extent of physiological response for a person under detection;

wherein the display image transmitted to the electronic device is an unprocessed raw image data captured by the photograph image processor;

wherein a sample database that corresponds to the analysis software is set in the cloud, and the sample database has the display images associated with the rapid screening paper after detection having different extents of the physiological response, and to generate the data parameter through calculating and sorting of the display images;

wherein the rapid screening paper after detection has a sample region, an observation region, and an identification marker respectively, and the observation region includes at least a control group and a test group for displaying the detection results;

wherein the analysis software identifies respectively a test group in the observation region and the identification marker to generate respectively the determination data and the parameter packet;

wherein one side of the in vitro detector is disposed on a display panel having a power display light, a wireless connection indicator light, a sample display light, and a transmission display light.

2. The portable and rapid screening detection in vitro detection system as claimed in claim 1, wherein the cloud receives the physiological response having the detected results and images of the test group in the parameter packet for storing and collecting the data.

3. The portable and rapid screening detection in vitro detection system as claimed in claim 1, wherein the electronic device is one of a smart phone, a tablet computer, a desktop computer, and a laptop computer.

4. The portable and rapid screening detection in vitro detection system as claimed in claim 1, wherein the transmission interface control processor is used to perform wired transmissions through a USB connection slot, and is used to perform wireless transmissions through Bluetooth or WiFi.

* * * * *